(12) United States Patent
Ajiki

(10) Patent No.: US 6,579,033 B2
(45) Date of Patent: Jun. 17, 2003

(54) COUPLING/FASTENING DEVICE FOR SQUARELY ARRANGED SQUARE BARS

(75) Inventor: Shin-ichi Ajiki, Tokyo (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 0 days.

(21) Appl. No.: 09/947,200

(22) Filed: Sep. 6, 2001

(65) Prior Publication Data

US 2002/0037195 A1 Mar. 28, 2002

(30) Foreign Application Priority Data

Sep. 6, 2000 (JP) ...................................... 2000-270527

(51) Int. Cl.$^7$ ............................................... E04G 7/00
(52) U.S. Cl. ...................... 403/403; 403/381; 403/382
(58) Field of Search ........................... 403/382, 403, 403/381, 367, 373, 374.1–374.3, 256, 258, 263, 264; 411/84, 85; 521/656.9, 655.1, 79.12, 653.1, 36.4

(56) References Cited

U.S. PATENT DOCUMENTS

| | | | | |
|---|---|---|---|---|
| 2,588,818 A | * | 3/1952 | Franks ........................ | 403/217 |
| 4,168,922 A | * | 9/1979 | Worrallo ..................... | 403/231 |
| 4,432,590 A | * | 2/1984 | Lawrence et al. .......... | 312/257 |
| 2002/0021936 A1 | * | 2/2002 | Rae-Smith ................. | 403/403 |

FOREIGN PATENT DOCUMENTS

| | | | | |
|---|---|---|---|---|
| CH | 329312 | * | 6/1958 | ................. 403/382 |

* cited by examiner

Primary Examiner—Lynne H. Browne
Assistant Examiner—Michael P Furguson
(74) Attorney, Agent, or Firm—Jacobson Holman PLLC

(57) ABSTRACT

A device for coupling a pair of square bars made of metal or some other material and arranged squarely in abutment relative to each other at a squarely abutting corner of the bars can remarkably reduce the time and effort required for the coupling operation and improve the coupling strength with which the square bars are coupled to each other and also the appearance of the coupled area. When coupling a pair of square bars, the first and second square bars provided respectively with first and second anti-release grooves are arranged to abut each other rectangularly and the first and second engagement sections of the inner joint are loosely put into the first and second anti-release grooves respectively. Then, the outer joint comprising a rear plate section and a pair of right-angled triangular lateral walls are brought into engagement with the inner joint and the fastening bolt is driven toward the corner section defined by the square bars and into the nut of the inner joint through the opening of the rear plate section until the first and second engagement sections are firmly pressed against the corresponding flanges of the first and second anti-release grooves while the first and second abutting edges of the rear plate section are firmly pressed against the first and second square bars.

2 Claims, 4 Drawing Sheets

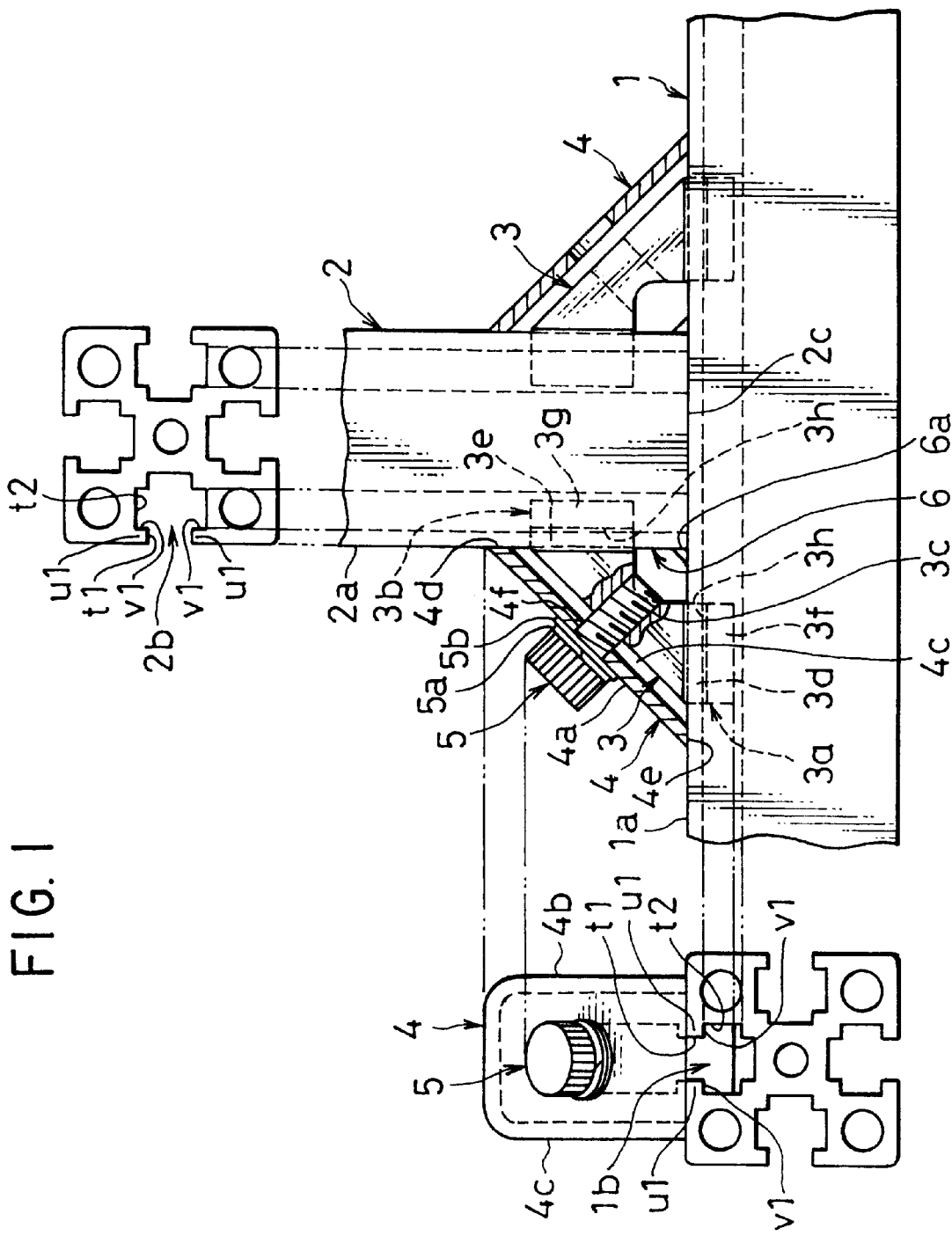
FIG. I

COUPLING/FASTENING DEVICE FOR SQUARELY ARRANGED SQUARE BARS

BACKGROUND OF THE INVENTION

1. Field of the Invention

This invention relates to a device for coupling/fastening a pair of square bars made of metal or some other material and arranged squarely in abutment relative to each other at a squarely abutting corner of the bars.

2. Related Background Art

FIGS. 4 and 5 of the accompanying drawings schematically illustrate a known coupling/fastening device of the type under consideration. Referring to FIGS. 4 and 5, a longitudinal first engagement/anti-release groove c is formed in a first lateral surface b of the first square bar a and a second end facet e of the second square bar is made to squarely abut the first lateral surface b. A second engagement/anti-release groove g is formed in a second lateral surface f of the second square bar d.

To couple the first and second square bars a, d that are arranged squarely relative to each other, an L-shaped coupling metal fitting h, first and second bolts i, j and first and second nuts k, m are brought in and the rectangularly extending first and second wings h1, h2 of the coupling metal fitting h are made to respectively abut the first and second lateral surfaces b, f at the corner R defined by the first and second lateral surfaces b, f of the first and second square bars a, d.

Then, as shown in FIG. 5, the first and second bolts i, j are respectively put into first and second bolt receiving holes n, p bored respectively through the first and second wings h1, h2 and then driven into the first and second nuts k, m that have been put respectively into the first and second engagement/anti-release grooves c, g from the front ends thereof for mutual engagement. As the first and second bolts i, j are sufficiently tightened, first and second pairs of anti-release flanges q, r of the first and second engagement/anti-release grooves c, g formed respectively in the first and second lateral surfaces b, f of the first and second square bars a, d, each pair of anti-release flanges facing each other, are pinched respectively by the first and second bolts i, j and the first and second nuts k, m so that consequently the first and second square bars a, d are firmly coupled to and held rectangularly relative to each other.

Thus, while the above described known coupling/fastening device operates properly for coupling squarely arranged square bars, the first and second square bars may not be coupled and fastened to each other satisfactorily simply by tightly securing the L-shaped coupling metal fitting h to the first and second square bars by means of the first and second bolts. Additionally, the operation of aligning the first and second nuts k, m loosely put into the first and second engagement/anti-release groove c, g and the corresponding first and second bolts is practically a considerably cumbersome one that consumes considerable time and effort.

SUMMARY OF THE INVENTION

In view of the above identified drawbacks of known coupling devices, it is therefore an object of the present invention to provide a coupling device that comprises not an L-shaped coupling metal fitting h, first and second bolts i, j and first and second nuts k, m but an inner joint having first and second engagement sections to be sequentially and loosely put into first and second anti-release grooves formed in first and second square bars at a corner defined by corresponding lateral surfaces thereof and an outer joint to be engaged with the inner joint, said outer joint having a pair of lateral plates with a right-angled triangular profile and a rear plate section. Then, as a bolt is driven through the rear plate section into a threaded hole formed in the inner joint, the inner joint is slidably pressed against the flanges of the first and second engagement/anti-release grooves of the first and second square bars while the first and second abutting edges of the outer joint are slidably pressed against the first and second square bars so as to improve the coupling strength with which the first and second square bars are coupled to each other and raise the overall mechanical strength of the coupling members of the coupling device.

The above object of the present invention can be achieved more reliably when the profiles of the first and second engagement/anti-release grooves of the first and second square bars and those of the first and second engagement sections of the inner joint to be loosely put into the first and second engagement/anti-release grooves.

According to the invention, the above object is achieved by providing a device for coupling/fastening a pair of square bars including a first square bar having a first longitudinal engagement/anti-release groove formed in a first lateral surface thereof and a second square bar arranged to squarely abut the first square bar at an end facet thereof and having a second longitudinal engagement/anti-release groove formed in a second lateral surface thereof, said device comprising:

an inner joint having first and second engagement sections arranged rectangularly relative to each other and adapted to be loosely put into the first and second engagement/anti-release grooves of said first and second square bars respectively at a corner defined by said first and second lateral surfaces of said first and second square bars and a threaded hole bored through the central part thereof connecting said first and second engagement sections;

an outer joint having a rear plate section having a through hole bored at the center thereof and a pair of right-angled triangular lateral walls extending rectangularly from said rear plate section and adapted to be engaged with said inner joint so as to make the first and second abutting edges of said first and second lateral plates linked to each other by way of said rear plate section to be arranged at said corner of said first and second square bars;

a fastening bolt adapted to be driven into said threaded hole of said inner joint by way of the through hole bored through said rear plate section of said outer joint toward said corner so as to bring said inner joint closer to the rear plate section of said outer joint and force said first and second engagement sections of said inner joint loosely put into the first and second engagement/anti-release grooves of said first and second square bars respectively to slide and move, while pushing said first and second abutting edges of said outer joint against said first and second lateral surfaces of said first and second square bars respectively at said corner.

Preferably, the first and second engagement/anti-release grooves formed respectively in the first and second lateral walls of the first and second square bars show a T-shaped cross section and each of them includes a narrow front aperture defined by a pair of flanges projecting toward each other and having respective anti-release surfaces at the rear sides thereof and a wide rear groove section exposed to said anti-release surfaces, whereas the first and second engagement sections arranged rectangularly relative to each other of said inner joint show a corresponding T-shaped cross section and include respectively first and second pairs of grooves to be engaged with the corresponding flanges defining said narrow front apertures of said first and second engagement/anti-release grooves and first and second head sections to be loosely received in the respective wide rear grooves of said first and second engagement/anti-release grooves;

the pairs of abutting edges of said first and second head sections exposed respectively to said first and second pairs of grooves of said inner joint being forced respectively to slide on and be pressed against said anti-release surfaces of said pairs of flanges of said first and second engagement/anti-release grooves of said first and second square bars by driving said bolt into the threaded hole of the inner joint.

BRIEF DESCRIPTION OF THE DRAWINGS

FIG. 1 is a partially cut out schematic front view of a coupling/fastening device for squarely arranged square bars with a partial plan view and a lateral view as viewed from the left side of FIG. 1.

DESCRIPTION OF THE PREFERRED EMBODIMENT

Figure 2A:
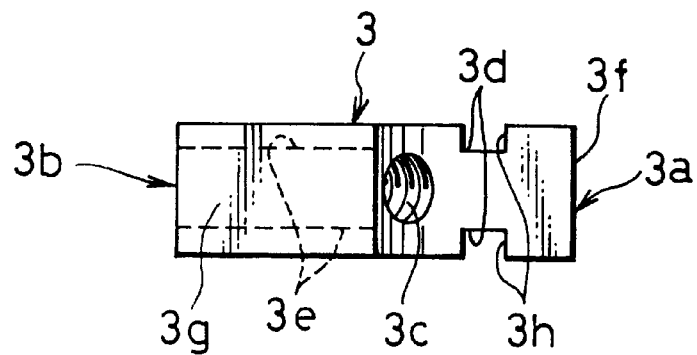
FIG. 2A is a schematic plan view of the inner joint of the coupling/fastening device of FIG. 1.
Figure 2C:
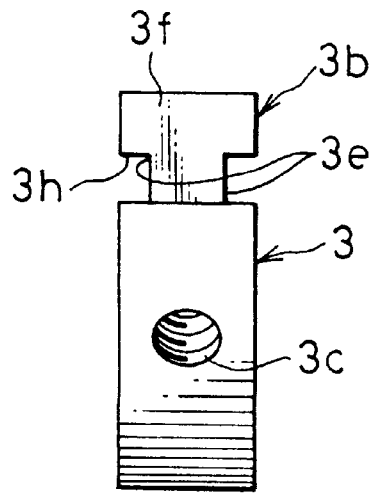
FIG. 2C is a schematic lateral view of the inner joint of FIG. 2A as viewed from the left side of FIG. 2B.

Now, the present invention will be described by referring to FIGS. 1 through 3C of the accompanying drawings that schematically illustrate a preferred embodiment of coupling/fastening device according to the invention and comprising an inner joint 3, an outer joint 4 and a bolt 5 for coupling and fastening first and second square bars 1 and 2 that are arranged rectangularly relative to each other.

As described above for the prior art, a longitudinal first engagement/anti-release groove 1c is formed in a first lateral surface 1a of the first square bar 1 along the entire length thereof and similarly a second engagement/anti-release groove 2b is formed in a second lateral surface 2a of the second square bar 2 along the entire length thereof. A second end facet 2c of the second square bar 2 is made to squarely abut the first lateral surface 1a of the first square bar 1.

Figure 2B:
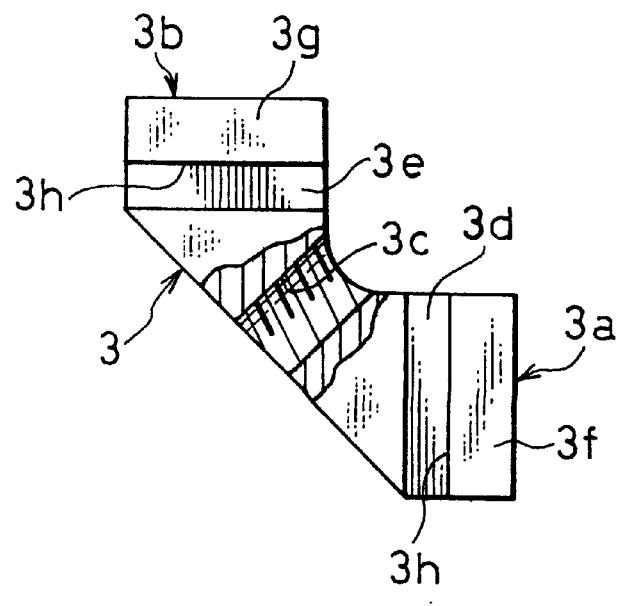
FIG. 2B is a schematic front view of the inner joint of FIG. 2A.

As shown in FIG. 2B, the inner joint 3 has first and second engagement sections 3a, 3b arranged rectangularly relative to each other and adapted to be loosely and unreleasably put into the first and second engagement/anti-release grooves 1b, 2b of said first and second square bars 1, 2 from respective open ends of the square bars until the inner joint 3 is placed at corner section 6 defined by the first and second lateral surfaces 1a, 2a as shown in FIG. 1.

Figure 3A:
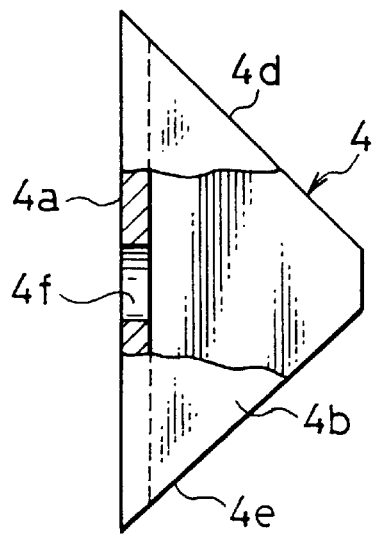
FIG. 3A is a partially cut out schematic plan view of the outer joint of the coupling/fastening device of FIG. 1.
Figure 3B:
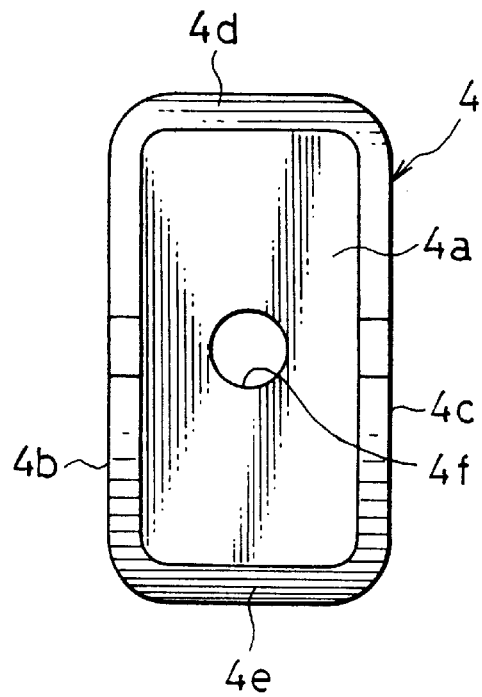
FIG. 3B is a schematic lateral view of the outer joint of FIG. 3A as viewed from the right side of FIG. 3A.
Figure 3C:
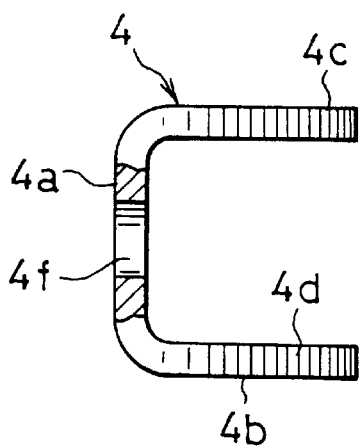
FIG. 3C is a schematic front view of the outer joint of FIG. 3A.
Figure 4:
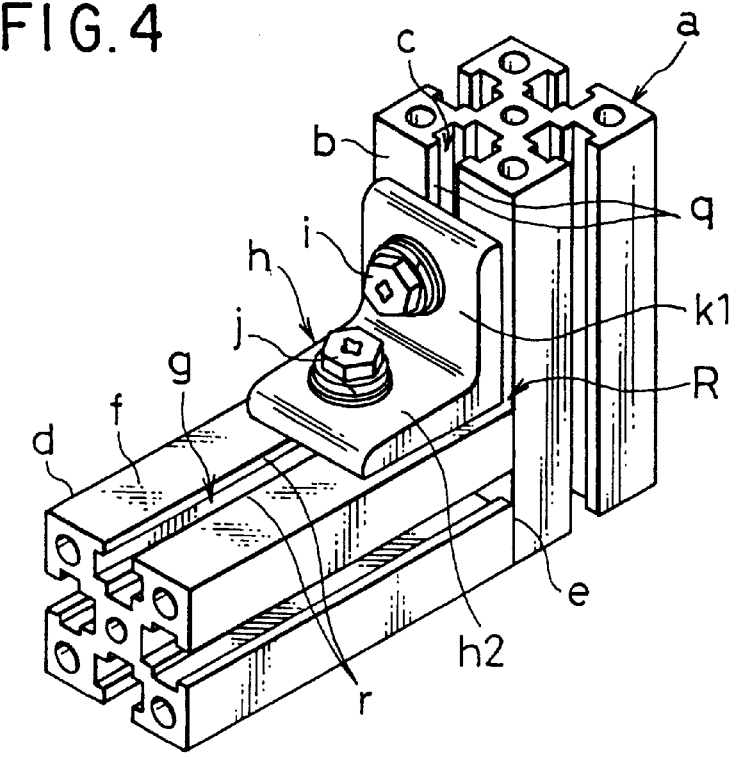
FIG. 4 is a schematic perspective view a known coupling/astening device for squarely arranged square bars.
Figure 5:
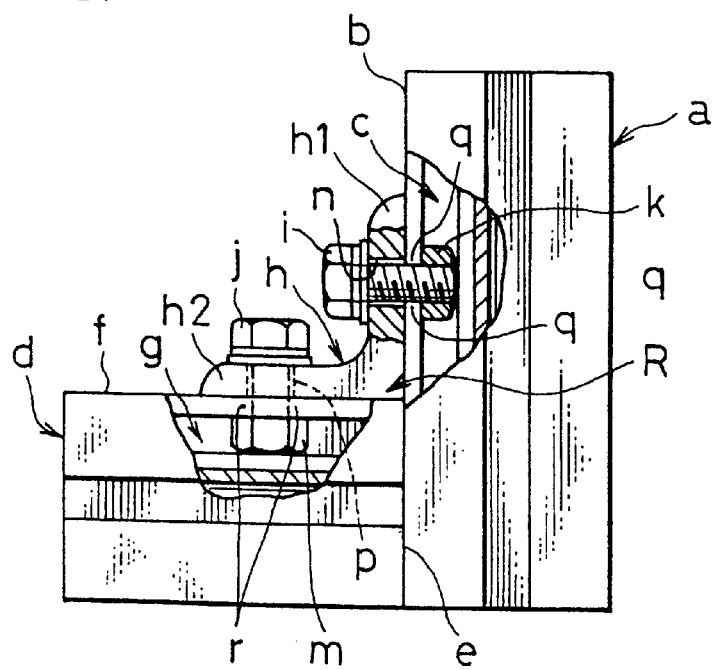
FIG. 5 is a partially cut out schematic front view of the coupling/fastening device of FIG. 4.

As shown in FIGS. 3A through 3C, the outer joint 4 has a rectangular rear plate section 4a having a through hole 4f bored at the center thereof and a pair of right-angled triangular lateral walls 4b, 4c extending rectangularly from the opposite lateral sides of the rear plate section 4a and adapted to be engaged with the inner joint 3 so as to make the first and second abutting edges 4d, 4e of each of the first and second lateral plates 4b, 4c that are linked to each other by way of the rear plate section 4a to be arranged at the corner section 6 of the first and second square bars 1, 2 and abut the first and second lateral surfaces 1a, 2a.

The fastening bolt 5 is adapted to be driven into the threaded hole 3c of the inner joint 3 arranged at the center thereof by way of the through hole 4f bored through the center of the rear plate section 4a of the outer join 4 toward the corner 6a of the corner section 6.

As the bolt 5 is driven into the threaded hole 3c of the inner joint 3, the inner joint 3 is pulled toward the rear plate section 4a of the outer joint 4 until the first and second engagement sections 3a, 3b of the inner joint 3 loosely slide in the first and second engagement/anti-release grooves 1b, 2b and become pressed against the corresponding walls of the first and second engagement/anti-release grooves 1b, 2b of the first and second square bars 1, 2 respectively, while the first and second abutting edges 4d, 4e of the outer joint 4 become pressed against the first and second lateral surfaces 1a, 2a of the first and second square bars 1, 2 at the corner section 6.

When the first and second engagement/anti-release grooves 1b, 2b formed respectively in the first and second lateral walls 1a, 2a of the first and second square bars 1, 2 show a T-shaped cross section and each of them includes a narrow front aperture defined by a pair of flanges u1, u1 projecting toward each other and having respective anti-release surfaces v1, v1 at the rear sides thereof and a wide rear groove section t2 exposed to the anti-release surfaces v1, v1 as shown in FIG. 1, the inner joint 3 preferably has a profile as described below.

Namely, the first and second engagement sections 3a, 3b arranged rectangularly relative to each other of said inner joint 3 show a corresponding T-shaped cross section and include respectively first and second pairs of grooves 3d, 3e to be engaged with the corresponding flanges u1, u1 defining said narrow front apertures of the first and second engagement/anti-release grooves 1b, 2b and first and second head sections 3f, 3g to be loosely received in the respective wide rear grooves t2 of the first and second wide engagement/anti-release grooves 1b, 2b as shown in FIGS. 2A and 2B.

Thus, as the bolt 5 is driven into the threaded hole 3c of the inner joint 3, the pairs of abutting edges 3h of the first and second head sections 3f, 3g exposed respectively to the first and second pairs of grooves 3d, 3e of the inner joint 3 are forced respectively to slide on and be pressed against the anti-release surfaces v1, v1 of the pairs of flanges u1, u1 of the first and second engagement/anti-release grooves 1b, 2b of the first and second square bars 1, 2.

When the first and second square bars 1, 2 are coupled to each other to make them show a T-shaped profile as shown in FIG. 1, preferably another coupling/fastening device comprising an inner joint, an outer joint and a fastening bolt are used at the corner section opposite to the corner section 6. It may be needless to say that a single coupling/fastening device is used when the first and second square bars 1, 2 are coupled to each other to make them show an L-shaped profile.

In FIG. 1, reference symbols 5a and 5b denote respectively a spring washer and a plain washer arranged between the bolt 5 and the rear plate section 4a of the outer joint 4.

Advantages of the Invention

As described above, with a coupling/fastening device for squarely arranged square bars according to the invention, it is only necessary for the first and second engagement sections to be respectively put into the first and second engagement/anti-release grooves of the first and second square bars and therefore the operability of the coupling/fastening device is dramatically improved if compared with a comparable known device with which the first and second fastening bolts have to be respectively driven into the first and second nuts that are hidden and positionally unstable. Additionally, since the inner joint is firmly pressed against the flanges of the first and second engagement/anti-release grooves of the first and second square bars by means of the fastening bolt and, at the same time, the outer joint is also firmly pressed against the first and second lateral surfaces of the first and second square bars, the coupling strength with which the first and second square bars are coupled to each other is remarkably improved and the overall mechanical strength of the coupling members of the coupling device is raised. Furthermore, since the objective of coupling/fastening two squares can be achieved by driving a single fastening bolts, the appearance of the device is simplified and the device is applicable to a variety of objects.

Still additionally, while a tool for driving bolts have to be operated along the first and second square bars when a known device is used, it only needs to be operated toward the corner defined by the first and second square bars when a device according to the invention is used so that the operator is relieved of cumbersome operations of driving bolts along bars and hence the time required for coupling/fastening square bars is greatly reduced.

Finally, when the profiles of the first and second engagement/anti-release grooves of the first and second squares are specifically defined, the corresponding first and second engagement sections of the inner joint can be made to show corresponding profiles to reliably achieve the objective of coupling/fastening the first and second square bars.

What is claimed is:

1. A device for coupling a pair of square bars including a first square bar having a first longitudinal anti-release groove formed in a first lateral surface thereof and a second square bar arranged to squarely abut the first square bar at an end facet thereof and having a second longitudinal anti-release groove formed in a second lateral surface thereof, said device comprising:

an inner joint having first and second engagement sections arranged rectangularly relative to each other and adapted to be loosely put into the first and second anti-release grooves of said first and second square bars respectively at a corner defined by said first and second lateral surfaces of said first and second square bars and a threaded hole bored through the central part thereof connecting said first and second engagement sections;

an outer joint having a rear plate section having a through hole bored at the center thereof and a pair of right-angled triangular lateral walls extending rectangularly from said rear plate section and defining first and second abutting edges, said outer joint adapted to be engaged with said inner joint so as to make said first and second abutting edges of said pair of right-angled triangular lateral walls, which are linked to each other by way of said rear plate section, to be arranged at said corner of said first and second square bars;

a fastening bolt adapted to be driven into said threaded hole of said inner joint by way of the through hole bored through said rear plate section of said outer joint toward said corner so as to bring said inner joint closer to the rear plate section of said outer joint and force said first and second engagement sections of said inner joint loosely put into the first and second anti-release grooves of said first and second square bars respectively to slide and move, while pushing said first and second abutting edges of said outer joint against said first and second lateral surfaces of said first and second square bars respectively at said corner.

2. A device for coupling a pair of square bars according to claim 1, wherein the first and second anti-release grooves formed respectively in the first and second lateral surface of the first and second square bars define a T-shaped cross section including a narrow front aperture defined by a pair of flanges projecting toward each other and having respective anti-release surfaces at the rear sides thereof and a wide rear groove section exposed to said anti-release surfaces, whereas the first and second engagement sections arranged rectangularly relative to each other of said inner joint define a corresponding T-shaped cross section and include respectively first and second pairs of grooves to be engaged with the corresponding flanges defining said narrow front apertures of said first and second anti-release grooves and first and second head sections to be loosely received in the respective wide rear grooves of said first and second anti-release grooves, each of said first and second head sections defining a pair of abutting edges;

each pair of abutting edges of said first and second head sections, exposed respectively to said first and second pairs of grooves of said inner joint, being forced respectively to slide on and be pressed against said anti-release surfaces of said pairs of flanges of said first and second anti-release grooves of said first and second square bars by driving said bolt into the threaded hole of the inner joint.

* * * * *